United States Patent Office 3,458,454
Patented July 29, 1969

3,458,454
FLUIDIZABLE CRACKING CATALYST
Jules S. Lapides, Broomall, and James E. McEvoy, Morton, Pa., assignors to Air Products and Chemicals, Inc., Philadelphia, Pa., a corporation of Delaware
No Drawing. Filed July 29, 1966, Ser. No. 568,736
Int. Cl. B01j 11/82; C10g 11/02
U.S. Cl. 252—455                                    3 Claims

ABSTRACT OF THE DISCLOSURE

Kaolin is calcined to provide partially mullitized kaolin, and converted to pellets of precursor consisting of sodium faujasite in an amorphous matrix. The pellets are comminuted so that particles having a size less than 2 microns constitute most of the weight of the product. Aqueous sodium silicate is added and the slurry is spray-dried to fluidizable particles. An aqueous system maintained at a pH from 5 to 9 transforms the fluidizable particles so that they withstand ion-exchange treatment. The transformed particles are treated with a solution of ammonium salt to provide fluidizable particles consisting of ammonium faujasite in an amorphous aluminosilicate matrix.

---

This invention relates to the manufacture of fluidizable cracking catalyst and particularly to a method of preparing such catalysts comprising a crystalline zeolitic component having large pores.

Cracking activity has been correlated for many years with acid activity, such as the presence of hydrogen zeolite resulting from heating an ammonium zeolite. Heretofore, both granular catalyst and fluidizable catalyst have been made by the thermal treatment of gelatinous ammonium zeolitic composition, such as disclosed by Bates 2,283,173. The cracking catalysts derived from gelatinous zeolites feature micropores which vary in size significantly.

At an early date, there were proposals that the hydrogen zeolites derived from crystalline zeolites be diluted in an aluminosilicate matrix and employed as cracking catalysts. Some of the crystalline hydrogen zeolites appeared less effective as cracking catalysts than aluminosilicate supported hydrogen zeolites derived from gelatinous precursors. Such inferiority was probably attributable to the pores of the crystals excluding the diffusion of aromatics but permitting diffusion of normal paraffins.

During a period of many years the technology concerned with absorption established that the dehydrated crystalline zeolites (sometimes called molecular sieves) have sorptive characteristics superior in certain ways to those of dehydrated gels inasmuch as the crystalline products possess pores of more uniform size. The ability selectively to absorb normal paraffins and to reject ring compounds (naphthenes and aromatics) was for many years a common feature among many molecular sieves. Dehydrated chabazite and most other molecular sieves containing crystalline zeolite have featured crystalline pores of the magnitude of about 3 to about 8 angstroms. Such small pore sieves proved to be only moderately satisfactory as cracking catalysts by reason of their tendency to obstruct the diffusion of naphthenes and aromatics toward the acidic sites in the catalyst structure.

In recent years large pore crystalline zeolites having molecular sieve pores of the magnitude of about 13 angstroms have been prepared by conventional heat treatment of ammonium faujasite, ammonium mordenite and other crystalline zeolites having a relatively low density. Although hydrogen faujasite and hydrogen mordenite had the obviously expected property of cracking activity, a difficulty was encountered in preparing cracking catalysts featuring the presence of such large pore crystalline zeolites but having a commercially acceptable level of activity, stability and selectivity. Previous cracking technology established the desirability of providing an aluminosilicate matrix for the hydrogen zeolite, but the dilution or support for the crystalline zeolites was not readily achieved.

In accordance with the present invention, fluidizable cracking catalyst is prepared by the spray drying of an anqueous dispersion of finely divided precursor, the conditions of the spray drying being so controlled that the distribution of particle sizes in the dried catalyst is within the acceptable range for fluidizable cracking catalyst.

In each of the examples herein, pellets of sodium faujasite in an aluminosilicate matrix are prepared and then comminuted until most of the solid weight has a particle size less than about 2 microns. Particular attention is directed to the requirement that the comminuting step provides particles predominantly smaller than about 2 microns, inasmuch as the attrition resistance and other properties of the fluidized catalyst are inferior if the ball milling (or equivalent pulverizing) provides particles of a different magnitude such as about 20 microns size. A liquid dispersion of the thus comminuted precursor (usually containing supplemental binder) is spray dried to produce particles of the approximately 15 to 150 micron range, that is, particles of the fluidizable range. Such fluidizable particles are treated with an aqueous ammonium salt to provide fluidizable particles comprising ammonium faujasite in an aluminosilicate matrix. After water washing, drying, and heat treatment, the fluidized particles may be shipped to a petroleum refinery for use as cracking catalyst. The heat treatment may be merely the latter stages of the drying, in which case only a portion of the ammonia will be volatilized, or it may be a stabilizing treatment (e.g., several hours in 800° C. steam) of sufficient severity to decrease the ammonia content below about 1%. To the extent that any ammonia is evolved, some hydrogen faujasite is formed. Thus the product shipped to the refinery is for convenience designated as fluidized particles comprising hydrogen faujasite in an aluminosilicate matrix without regard to the severity of treatment removing ammonia from the ammonium exchanged particles.

Preparation of pellets of sodium faujasite in aluminosilicate matrix

Reference is made to the application of Lee A. Cosgrove, Ser. No. 463,860, filed June 14, 1965, for a description of the preparation of pellets of sodium faujasite in an aluminosilicate matrix, which pellets are sometimes for convenience designated as "Cosgrove pellets," and the following excerpts from Example 1 of said application are reiterated to clarify the general procedure.

"A dry blend of plastic kaolin, partially mullitized kaolin, and meta kaolin is prepared as follows, the quantities being those intended to yield, in view of mechanical and other loses, about 100 kg. of cracking catalyst

|  | Kg. |
|---|---|
| Plastic kaolin | 73.09 |
| Partially mulltized kaolin | 31.33 |
| Meta kaolin | 5.22 |
| Dry blend | 109.64 |

"An aqueous solution containing about 17.8% by weight sodium hydroxide (about 5 Normal, about 1.19 density or about 21.5 $H_2O/Na_2O$ ratio) is prepared, and admixed with the three component clay in a conventional ribbon blender."

"Particular attention is directed to the feature of employing high pressure to transform the alkalinized clay into a plastic dough having a composition (summation of previous data) as follows:

| | |
|---|---|
| $Na_2O$ | 5.82 |
| Alumina disilicate: | |
|     Plastic kaolin | 62.90 |
|     Partially mullitized kaolin | 31.23 |
|     Meta kaolin | 5.19 |
| Total aluminum disilicate | 99.31 |
| Water: | |
|     $H_2O$ from aluminum disilicate | 10.33 |
|     From NaOH | 1.69 |
|     Solution | 34.61 |
| Total $H_2O$ | 46.63 |
| Total dough | 151.76 |

The moles of components in such composition corresponds to:

| | |
|---|---|
| $Al_2O_3$ | 0.447 |
| $SiO_2$ | 0.895 |
| $Na_2O$ | 0.0937 |
| $H_2O$ | 2.595 |

Zeolites are conventionally evaluated with reference to the presence of one mole of alumina so these proportions provide:

| | |
|---|---|
| $Al_2O_3$ | 1.00 |
| $SiO_2$ | 2.00 |
| $Na_2O$ | 0.21 |
| $H_2O$ | 5.80 |

The unit mole ratios for the dough are as follows:

| | |
|---|---|
| $Na_2O/Al_2O_3$ | 0.21 |
| $SiO_2/Al_2O_3$ | 2.0 |
| $H_2O/Na_2O$ | 27.6 |
| $H_2O/Al_2O_3$ | 5.80 |
| $Al^{+++}/Na^{+}$ | 4.77 |

If the partially mullitized silica were treated as a mixture of silica, mullite, and meta kaolin, and if the mullite were then ignored, some of the ratios would then be different from those based upon the more valid assumption that no portion of the reaction mixture is absolutely inert in the reaction.

The high pressure mixing must be continued for from 5 to 50 minutes in order to transform the initial mixture into a plastic composition suitable for reliable extrusion."

"After a bed of granular particles has been formed in a tank, the tank is filled with a mineral oil having a high flash point and a viscosity comparable to a light lubricating oil. The particles age at a temperature conveniently designated as ambient temperature. Heat is generated by the reaction of the alkali and clay components and the aging oil may be circulated through a heat exchanger to maintain the temperature within the range (usually the upper portion thereof) from about 10° C. to about 40° C., which is substantially the same temperature range in the plant attributable to variations in the weather. Such aging at ambient temperature is continued for about 24 hours. A circulating pump directs the oil through a heat exchanger, where by the temperature of the granules is increased from ambient temperature to about 95° C. during a one hour period, and maintained at this temperature for about 24 hours."

The generic procedure for preparing Cosgrove pellets, as clarified in original claim 4 of said application consists essentially of the steps of preparing a dry mixture in which the proportions of anhydrous refractory oxide material provide about 55–70% plastic kaolin-type clay containing 13–25% hydrate water, about 20–40% of calcined refractory oxide containing less than about 0.3% hydrate water, and about 4–19% of reactive refractory oxide containing hydrate water in the range from 0.3% to 2%; mixing such dry mixture with an alkaline solution to provide a unit ratio of aluminum ion to alkaline cation from 2 to 6 and unit ratio of moles of water to moles of alumina from 5 to 8; subjecting the resulting alkaline aqueous aluminosilicate to high pressure mixing by a mulling operation for from about 5 to 50 minutes, said mulling being effective in squeezing together the components into a plastic dough; extruding pellets from such plastic dough; converting such extruded pellets in particles corresponding in shape generally to that desired for the cracking catalyst particles; immersing the particles in an oil bath for aging for from about 16 to 32 hours at about ambient temperature and about 8 to 40 hours at about 80° C. to about 120° C.

EXAMPLE I

After pellets have been aged in mineral oil at 95° C. for about 24 hours, the oil is drained away, and the Cosgrove pellets are cleaned with volatile solvent to remove traces of residual oil. Such dried Cosgrove pellets containing dilute sodium zeolite are subjected to a hammermill which pulverizes the pellets into a flour of aluminosilicate supported sodium zeolite. This flour is mixed with water and subjected to a ball-mill to produce an alkaline slurry (e.g. a dispersion susceptible to measurable precipitation or settling upon standing for a brief period such as a week) in which most of the solid weight consists of particles of aluminosilicate smaller than about 2 microns, that is, so small that dispersion of the particles in the aqueous system requires only minor agitation.

It is oftentimes helpful to incorporate a binder in the slurry. Sodium silicate is an example of a binder which can be added to the slurry prior to the step of spray drying. The amount of sodium silicate employed is expressed in terms of the amount of silica scheduled to be present in the ion exchanged catalyst. Good microspheres are prepared by spray drying the slurry consisting of water, a minor amount of sodium silicate, and particles smaller than about 2 microns. After spray drying, and ion exchange the microsphere particles contain added silica binder corresponding to approximately 10% of the weight of the final catalyst. By a series of tests, it is established that the range of concentration of added silica binder should be from about 6% to about 25%. Less satisfactory steam stability characterizes products having more than about 25% silica binder. Poor resistance to attrition is a disadvantage of microspheres containing less than about 6% silica binder.

The slurry of aluminosilicate particles smaller than about 2 microns, sodium silicate providing 8.7% silica, and water is subjected to spray drying to produce microspheres having a particle size range from about 15 microns to about 150 microns. The microspheres are ion exchanged with an aqueous ammonium salt solution to provide microspheres consisting of aluminosilicate carrier, a minor amount of ammonium faujasite, and 8.7% silica binder. These microspheres are calcined in steam for 4 hours at 810° C. to provide fluidized cracking catalyst. Said cracking catalyst contains about 16% zeolite (measured by X-ray) and the silica to alumina ratio of the zeolitic component is about 4.4. The total silica to alumina mol ratio is about 2.33 to 1. The iron oxide content of the catalyst is 0.16% and its soda content is 0.63%.

A catalyst prepared along the lines of that just described is pelleted and tested by a standard Cat. D–1 test to determine the effectiveness of the catalyst in cracking a standard gas oil at standard conditions. Samples of the cracking catalyst were subjected to accelerated aging by treatment with steam at various temperature to provide some indication of the long term stability of the catalyst, and then tested by said standard procedure to obtain results as follows:

| 4 hrs. steam treat at | 1,350° F. | 1,500° F. | 1,550° F. |
|---|---|---|---|
| Gasoline, vol. percent | 61.2 | 57.2 | 45.2 |
| Coke, wt. percent | 4.5 | 1.8 | 1.3 |
| Gas, wt. percent | 25.0 | 10.9 | 8.0 |
| Conversion, wt. percent | 83.3 | 63.0 | 49.0 |
| Select., wt. percent | 65.7 | 80.7 | 81.1 |
| Gas gravity | 1.66 | 1.55 | 1.50 |

The data on the performance of the catalyst in such accelerated aging tests indicate that the fluidized catalyst would be superior to some commercially employed fluidized cracking catalysts.

The fluidized catalyst was subjected to an accelerated attrition test and during the 17 hour period ending with the 22nd hour of testing, the attrition rate was 0.16% per hour, which was superior to that of some commercial marketed fluidized cracking catalysts.

EXAMPLE II

Pelleted pellets containing about 20% sodium faujasite in an aluminosilicate carrier, and prepared by the previously discussed Cosgrove procedure, are ground in a hammermill to a flour. This flour is transferred to a ball mill, mixed with water, and ground to a uniform slurry. A recycle stream containing substantially all of the particles larger than 0.1 micron is separated from the main product stream to increase the productivity of the ball mill.

The slurry of small size supported sodium faujasite particles is blended with sodium silicate containing silica corresponding to 25% of the total aluminosilicate content (about 33.3% of the aluminosilicate from the ball mill) and the mixture is spray dried. The particles are dispersed in a dilute sulfuric acid to provide a slurry having a pH of about 7 (at least pH 5 but not more than pH 9), water rinsed, and treated with ammonium sulfate providing about 4 equivalents of ammonium per residual sodium ion in the particles, and then water rinsed, and dried to provide fluidized cracking catalyst having a combination of activity, selectivity, stability and attrition resistance within the range acceptable for fluidized cracking catalyst. Although the ammonium sulfate requirements were smaller by reason of the partial neutralization of the spray dryed particles with inexpensive sulfuric acid, the activity of the catalyst was not jeopardized by this cost-saving modification.

EXAMPLE III

A fluidized cracking catalyst is prepared following the procedure of Example II, but using sodium silicate in an amount providing in the final catalyst only 6% silica binder (silicate soda about 6.38% of the aluminosilicate content of slurry from ball mill). The fluidized catalyst has acceptable attrition resistance, superior to that of some fluidized cracking catalysts marketed in recent decades, but inferior to the attrition resistance of the catalysts of Examples I and II. The fluidized catalyst has an advantageous combination of activity, selectivity and stability as explained in connection with Example I.

Summary of limitations

By a series of tests it is established that fluidizable cracking catalyst particles should be prepared by a method comprising the steps of: calcining a hydrated aluminum disilicate to transform it into an aluminum disilicate which is predominantly amorphous but so severely calcined as to possess the characteristics conveniently designated as "partially mullitized"; mixing an aqueous alkaline solution with components comprising said predominantly amorphous partially mullitized aluminum disilicate to provide an alkalized aluminosilicate mineral composition; aging the alkalized aluminosilicate mineral composition at ambient temperature for about a day; aging pellets comprising the ambient-aged alkalized aluminosilicate mineral composition at about 80° C. to about 120° C. in an inert organic liquid for about a day; removing the inert organic liquid from the aged pellets to provide pellets comprising sodium faujasite in an aluminosilicate matrix; grinding the pellets to finely pulverized particles most of the weight consisting of particles smaller than 2 microns; dispersing the finely comminuted particles in an aqueous alkaline solution comprising silica and sodium ion, the amount of silica being from 6% to 25% of the total of aluminosilicate plus silica; spray drying the dispersion to produce particles within the fluidizable cracking catalyst particle size range; and subjecting the fluidizable particles to ion exchange with an aqueous ammonium salt solution.

Obviously many modifications and variations of the invention as hereinbefore set forth may be made without departing from the spirit and scope thereof, and therefore only such limitations should be imposed as are indicated in the appended claims.

What is claimed is:

1. The method of preparing fluidizable cracking catalyst particles which consists essentially of the steps of: severely calcining a hydrated aluminum disilicate to transform it into a predominantly amorphous, partially mullitized aluminum disilicate; mixing an aqueous alkaline solution with components comprising said predominantly amorphous partially mullitized aluminum disilicate to provide an alkalized aluminosilicate mineral composition; aging a composition comprising said alkalized aluminosilicate at ambient temperature for about a day; aging pellets comprising such ambient-aged composition at about 80° C. to about 120° C. for about a day, the pellets being immersed in inert organic liquid during such aging at 80° to 120° C.; removing the inert organic liquid from the aged pellets to provide aged pellets comprising sodium faujasite in an amorphous matrix consisting essentially of oxides of aluminum, silicon, and sodium; grinding the aged pellets to finely comminuted particles, most of the weight consisting of particles smaller than 2 microns; dispersing the finely comminuted particles in an aqueous alkaline solution comprising silica and sodium ion, the amount of silica being from 6% to 25% of the total of cracking catalyst components; spray drying the dispersion to produce particles within the fluidizable cracking catalyst particle size range; and subjecting the fluidizable particles to treatment with an aqueous system providing a resultant pH in the range from pH 5 to pH 9; and subjecting such particles to ion-exchange with an aqueous ammonium salt solution.

2. The method of claim 1 in which predominantly amorphous partially mullitized kaolin, meta kaolin, kaolin, sodium hydroxide, and water are the raw materials employed in manufacturing such pellets.

3. The method of claim 2 in which the amount of sodium silicate binder corresponds to a silica content of about 10% by weight in the cracking catalyst.

References Cited

UNITED STATES PATENTS

| 3,275,571 | 9/1966 | Mattox | 252—455 X |
| 3,225,398 | 6/1967 | Ashwill | 252—455 X |
| 3,252,796 | 11/1967 | Kimberlin et al. | 252—455 |
| 3,367,887 | 2/1968 | Haden et al. | 252—455 |

DANIEL E. WYMAN, Primary Examiner

C. F. DEES, Assistant Examiner

U.S. Cl. X.R.

208—120

PO-1050
(5/69)

UNITED STATES PATENT OFFICE
CERTIFICATE OF CORRECTION

Patent No. 3,458,454       Dated July 29, 1969

Inventor(s) JULES S. LAPIDES and JAMES E. McEVOY

It is certified that error appears in the above-identified patent and that said Letters Patent are hereby corrected as shown below:

Column 2, line 10, "anqueous" should read --aqueous--.

Column 4, line 13, "in" should read --into--.

Column 4, line 73, "aceclerated" should read --accelerated--.

Column 5, line 42, after "for" insert --faujasite type--.

SIGNED AND
SEALED
APR 28 1970

(SEAL)
Attest:

Edward M. Fletcher, Jr.
Attesting Officer

WILLIAM E. SCHUYLER,
Commissioner of Patent